United States Patent
Nakagawa (10) Patent No.: US 11,390,781 B2
(45) Date of Patent: *Jul. 19, 2022

(54) AQUEOUS DISPERSION AND LAMINATE (71) Applicant: MITSUI CHEMICALS, INC., Tokyo (JP)

(72) Inventor: Junichi Nakagawa, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 509 days.

This patent is subject to a terminal disclaimer.

(21) Appl. No.: 16/481,408

(22) PCT Filed: Jan. 23, 2018

(86) PCT No.: PCT/JP2018/001871
§ 371 (c)(1),
(2) Date: Jul. 26, 2019

(87) PCT Pub. No.: WO2018/142997
PCT Pub. Date: Aug. 9, 2018

(65) Prior Publication Data
US 2019/0375965 A1 Dec. 12, 2019

(30) Foreign Application Priority Data
Feb. 6, 2017 (JP) .............................. JP2017-019819

(51) Int. Cl.
| | |
|---|---|
| B32B 27/08 | (2006.01) |
| B32B 27/28 | (2006.01) |
| B32B 27/30 | (2006.01) |
| B32B 27/32 | (2006.01) |
| C08J 3/05 | (2006.01) |
| C08L 33/06 | (2006.01) |
| C09J 7/20 | (2018.01) |
| C09J 7/35 | (2018.01) |
| C09J 11/08 | (2006.01) |
| C09J 123/08 | (2006.01) |
| C09J 131/04 | (2006.01) |
| C09J 133/06 | (2006.01) |
| C08L 23/08 | (2006.01) |
| C08F 2/44 | (2006.01) |
| C08F 255/02 | (2006.01) |

(52) U.S. Cl.
CPC ......... *C09J 123/0876* (2013.01); *B32B 27/08* (2013.01); *B32B 27/28* (2013.01); *B32B 27/30* (2013.01); *B32B 27/32* (2013.01); *C08F 2/44* (2013.01); *C08F 255/02* (2013.01); *C08J 3/05* (2013.01); *C08L 23/0846* (2013.01); *C09J 7/20* (2018.01); *C09J 7/35* (2018.01); *C09J 11/08* (2013.01); *C09J 123/08* (2013.01); *C09J 131/04* (2013.01); *C09J 133/06* (2013.01); C08L 33/06 (2013.01); C08L 2201/54 (2013.01); C08L 2205/03 (2013.01); C09J 2301/414 (2020.08); C09J 2423/04 (2013.01); C09J 2433/00 (2013.01)

(58) Field of Classification Search
None
See application file for complete search history.

(56) References Cited

U.S. PATENT DOCUMENTS

| | | | | |
|---|---|---|---|---|
| 10,435,595 | B2 * | 10/2019 | Kusumoto | ............ B32B 27/304 |
| 2018/0282596 | A1 | 10/2018 | Kusumoto et al. | |

FOREIGN PATENT DOCUMENTS

| | | | |
|---|---|---|---|
| JP | S51-62890 | A | 5/1976 |
| JP | S59-149943 | A | 8/1984 |
| JP | H04-30970 | B2 | 5/1992 |
| JP | H05-39975 | B2 | 6/1993 |
| JP | H07-8933 | B2 | 2/1995 |
| JP | 2000-128599 | A | 5/2000 |
| JP | 2001-179909 | A | 7/2001 |
| JP | 2001-181588 | A | 7/2001 |
| JP | 2006-199951 | A | 8/2006 |
| WO | WO-2006/068309 | A1 | 6/2006 |
| WO | WO-2016/076130 | A1 | 5/2016 |

OTHER PUBLICATIONS

International Searching Authority, "International Search Report," issued in connection with International Patent Application No. PCT/JP2018/001871, dated Apr. 17, 2018.
International Searching Authority, "Written Opinion," issued in connection with International Patent Application No. PCT/JP2018/001871, dated Apr. 17, 2018.
International Preliminary Report on Patentability issued in International Application No. PCT/JP2018/001871 dated Apr. 17, 2018.

* cited by examiner

Primary Examiner — Sheeba Ahmed
(74) Attorney, Agent, or Firm — Foley & Lardner LLP (57) ABSTRACT An aqueous dispersion contains a resin component and water, wherein the resin component contains composite particles (D) having the ethylene-unsaturated carboxylic acid copolymer (A) and the polymer having an acrylic acid ester unit as a polymerization unit (B), and composite particles (E) having the ethylene-unsaturated carboxylic acid copolymer (A) and the ethylene-vinyl acetate copolymer (C).

7 Claims, 1 Drawing Sheet

AQUEOUS DISPERSION AND LAMINATE

RELATED APPLICATIONS

The present application claims priority under 37 U.S.C. § 371 to International Patent Application No. PCT/JP2018/001871, filed Jan. 23, 2018, which claims priority to and the benefit of Japanese Patent Application No. 2017-019819, filed on Feb. 6, 2017. The contents of these applications are hereby incorporated by reference in their entireties.

TECHNICAL FIELD

The present invention relates to an aqueous dispersion and a laminate. In particular, the present invention relates to an aqueous dispersion, and a laminate produced by using the aqueous dispersion.

BACKGROUND ART

It has been known that conventionally in various industrial fields, a substrate such as a plastic film, vapor deposition film, metal foil, paper, and nonwoven fabric is bonded (that is, heat sealed) by heat and pressure. In heat sealing, generally, an adhesive layer is formed in advance on the substrate, and the substrates are bonded with the adhesive layer interposed therebetween, or the substrate and an adherend are bonded with the adhesive layer interposed therebetween.

For the material used for such heat sealing, a heat seal adhesive composition and a heat seal material such as the following is proposed: the heat seal adhesive composition including an emulsion in which resin particles containing olefin polymer (A) and acrylic polymer (B) in the same particle are dispersed in water, and the heat seal material composed of the heat seal adhesive composition applied on a substrate. (for example, Patent Document 1 and Patent Document 2 below).

CITATION LIST

Patent Document

Patent Document 1: Japanese Unexamined Patent Publication No. 2001-179909
Patent Document 2: WO 2016/076130

SUMMARY OF THE INVENTION

Problem to be Solved by the Invention

Depending on the types and use of the substrate and adherend, heat sealing of a short period of time and/or at low temperature may be further required.

An object of the present invention is to provide an aqueous dispersion having excellent adhesive strength and anti-blocking even with a short period of heat sealing time, and a laminate produced by using the aqueous dispersion.

The anti-blocking means that the laminates do not stick together even when they are placed on top of another.

Means for Solving the Problem

The present invention [1] includes an aqueous dispersion containing a resin component and water,
wherein the resin component contains ethylene-unsaturated carboxylic acid copolymer (A), polymer having an acrylic acid ester unit as a polymerization unit (B), and ethylene-vinyl acetate copolymer (C); and
contains composite particles (D) having the ethylene-unsaturated carboxylic acid copolymer (A) and the polymer having an acrylic acid ester unit as a polymerization unit (B) and composite particles (E) having the ethylene-unsaturated carboxylic acid copolymer (A) and the ethylene-vinyl acetate copolymer (C).

The present invention [2] includes the aqueous dispersion of the above-described [1], wherein relative to 100 mass % of the resin component, 35 to 70% of the ethylene-unsaturated carboxylic acid copolymer (A) is contained, 25 to 64.5% of the polymer having an acrylic acid ester unit as a polymerization unit (B) is contained, and 0.5 to 20% of the ethylene-vinyl acetate copolymer (C) is contained. (where a total of (A), (B), and (C) is 100%)

The present invention [3] includes a method for producing the aqueous dispersion described in [1] above, the method including the steps of: a step of producing dispersion liquid 1 containing resin particles (I) composed of ethylene-unsaturated carboxylic acid copolymer (A) by emulsifying the ethylene-unsaturated carboxylic acid copolymer (A) in the presence of water; a step of producing dispersion liquid 2 containing composite particles (D) having the copolymer (A) and the polymer (B) by adding (meth)acrylic acid ester monomer in the dispersion liquid 1 to form the polymer having an acrylic acid ester unit as a polymerization unit (B); a step of producing dispersion liquid 3 containing composite particles (E) having the copolymer (A) and the copolymer (C) by emulsifying the ethylene-unsaturated carboxylic acid copolymer (A) and ethylene-vinyl acetate copolymer (C) at the same time in the presence of water; and a step of producing dispersion liquid containing the composite particles (D) and the composite particles (E) by mixing the dispersion liquid 2 and the dispersion liquid 3.

The present invention [4] includes a laminate including a substrate and an adhesive layer laminated on at least on one side surface of the substrate, wherein the adhesive layer is produced by drying the aqueous dispersion described in [1] above.

The present invention [5] includes the laminate described in [4] above, further including an adherend layer laminated on one side surface of the adhesive layer.

The present invention [6] includes the laminate described in [5] above, wherein the adherend layer contains polyvinyl chloride and/or polyvinylidene chloride.

Effects of the Invention

The aqueous dispersion of the present invention, and the laminate produced by using the aqueous dispersion achieve excellent adhesive strength and anti-blocking even when they are heat sealed with a short period of time and/or at a low temperature.

DESCRIPTION OF THE EMBODIMENTS

Figure 1:
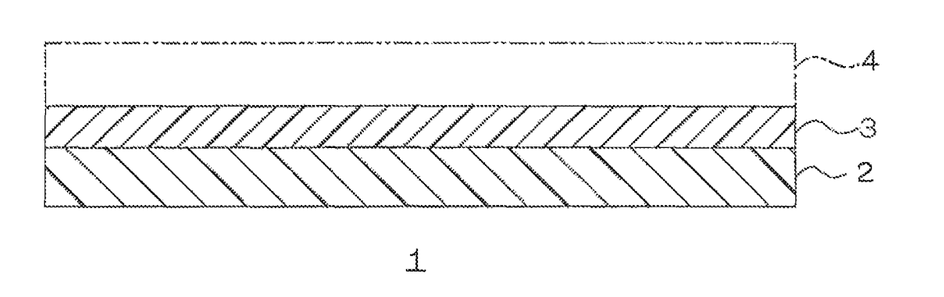
The FIGURE is a schematic diagram illustrating an embodiment of the laminate of the present invention.

In this specification, the numeral value range shown with "to" includes the lower limit value and the upper limit value adjacent to the "to" in the numeral value range.

In the specification, the upper limit value or the lower limit value is shown in the different scale of numeral value ranges, and the upper limit value or the lower limit value in one scale of numeral value range can be replaced with the upper limit value or the lower limit value of another scale of numeral value range.

The aqueous dispersion of the present invention contains a resin component and water that disperses the resin component.

The resin component contains the ethylene-unsaturated carboxylic acid copolymer (A), polymer having a (meth) acrylic acid ester unit as a polymerization unit (B), and ethylene-vinyl acetate copolymer (C).

In the aqueous dispersion of the present invention, the ethylene-unsaturated carboxylic acid copolymer (A) and polymer having a (meth)acrylic acid ester unit as a polymerization unit (B) form composite particles (D). The ethylene-unsaturated carboxylic acid copolymer (A) and ethylene-vinyl acetate copolymer (C) form composite particles (E). The aqueous dispersion contains composite particles (D) having (A) and (B), and composite particles (E) having (A) and (C).

<Ethylene-Unsaturated Carboxylic Acid Copolymer (A)>

The ethylene-unsaturated carboxylic acid copolymer (A) is produced by copolymerization of a first monomer component.

The first monomer component contains ethylene and unsaturated carboxylic acid.

The unsaturated carboxylic acid is a monomer having both at least one ethylenic unsaturated bond and a carboxy group, and for example, monobasic acids such as acrylic acid, methacrylic acid, and crotonic acid, and dibasic acids such as maleic acid, fumaric acid, and itaconic acid are used.

These unsaturated carboxylic acids may be used singly or in a combination of two or more.

For the unsaturated carboxylic acid, in view of water resistance, preferably, monobasic acids are used, and more preferably, acrylic acid and methacrylic acid are used.

In the first monomer component, the ethylene content and the unsaturated carboxylic acid content relative to their total is as follows: the ethylene content is, for example, 75 mass % or more, preferably 78 mass % or more, and for example, 90 mass % or less, preferably 88 mass % or less. The unsaturated carboxylic acid content is, for example, 10 mass % or more, preferably 12 mass % or more, and 25 mass % or less, preferably 22 mass % or less.

When the ethylene content and the unsaturated carboxylic acid content are within the above-described range, excellent adhesive strength and anti-blocking can be achieved.

The polymerization of the first monomer component is not particularly limited, but a known polymerization method is used. For example, the above-described first monomer component is allowed to contact with a known polymerization initiator such as peroxide under high temperature and high pressure conditions.

The ethylene-unsaturated carboxylic acid copolymer (A) can be produced as a dispersion (aqueous dispersion) in which resin particles (I) of the ethylene-unsaturated carboxylic acid copolymer (A) are dispersed in water. In this case, for example, the first monomer component can be polymerized by the method described in, for example, Japanese Examined Patent Publication No. H7-008933, Japanese Examined Patent Publication No. H5-039975, Japanese Examined Patent Publication No. H4-030970, Japanese Examined Patent Publication No. S42-000275, Japanese Examined Patent Publication No. S42-023085, Japanese Examined Patent Publication No. S45-029909, and Japanese Unexamined Patent Publication No. S51-062890. The ethylene-unsaturated carboxylic acid copolymer (A) has self-emulsifying properties.

In the production of the ethylene-unsaturated carboxylic acid copolymer (A), in view of improvement in production stability, as necessary, an emulsifier (surfactant) to be described later can be blended. The mixing ratio of the emulsifier is suitably set in accordance with purpose and use.

In the production of the ethylene-unsaturated carboxylic acid copolymer (A), in view of improvement in production stability, known additives such as the following can be blended at a suitable ratio: a pH adjusting agent, a sequestering agent such as ethylene diamine tetraacetic acid and its salt, and molecular weight regulating agents (chain transfer agent) such as mercaptans and a low molecular weight halogen compound.

The ethylene-unsaturated carboxylic acid copolymer (A) is preferably neutralized for use, in view of improvement in dispersion stability of the composite particles (D), composite particles (E), and resin particles (I), and printability of the laminate (described later).

In neutralizing, for example, to the ethylene-unsaturated carboxylic acid copolymer (A), to be specific, to a dispersion of the ethylene-unsaturated carboxylic acid copolymer (A), a basic compound as a neutralizing agent is added.

Examples of the basic compound include inorganic basic compounds such as sodium hydroxide, and potassium hydroxide, and organic basic compounds such as amines including ammonia, triethylamine, triethanol amine, and dimethylethanol amine.

These basic compounds may be used singly or in a combination of two or more.

For the basic compound, preferably, an inorganic basic compound is used, more preferably, sodium hydroxide is used.

The basic compound is added in an amount of, in view of improvement in dispersion stability of the composite particles (D), composite particles (E), and resin particles (I), and printability of the laminate (described later), relative to 100 mol of the carboxy group of the ethylene-unsaturated carboxylic acid copolymer (A), for example, 5 mol or more, preferably 30 mol or more, more preferably 50 mol or more, and for example, 200 mol or less, preferably 150 mol or less.

When the amount of the basic compound added is less than the above-described range, stability of the composite particles (D), composite particles (E), and resin particles (I) in the aqueous dispersion may be reduced, and printability may be reduced. When the amount of the basic compound added is more than the above-described range, the viscosity of the aqueous dispersion may be increased, and workability may be reduced.

After the addition of the neutralizing agent, preferably, it is allowed to stand at a predetermined temperature for a predetermined time.

The conditions for the above can be the following: the temperature can be, for example, 40° C. or more, preferably 50° C. or more, and for example, 190° C. or less, preferably 180° C. or less. The time can be, for example, 30 minutes or more, preferably 1 hour or more, and for example, 12 hours or less, preferably 10 hours or less.

By allowing it to stand under the above-described conditions, the carboxy group is neutralized, and dispersion stability of the composite particles (D), composite particles (E), and resin particles (I) and printability of the laminate (described later) can be improved.

When the ethylene-unsaturated carboxylic acid copolymer (A) is neutralized, the degree of neutralization is, for example, 30% or more, preferably 50% or more, and for example, 200% or less, preferably 150% or less.

When the degree of neutralization is within the above-described range, excellent adhesive strength and anti-blocking can be achieved. The degree of neutralization is calculated in accordance with Examples to be described later.

The weight-average molecular weight of the ethylene-unsaturated carboxylic acid copolymer (A) is, based on polystyrene standard calibration of Gel Permeation Chromatography (GPC), for example, 10000 or more, preferably 30000 or more, and for example, 200000 or less, preferably 150000 or less.

The ethylene-unsaturated carboxylic acid copolymer (A) has a melting point of, for example, 55° C. or more, preferably 65° C. or more, and for example, 110° C. or less, preferably 100° C. or less. The melting point is determined by DSC (differential scanning calorimetry method).

The resin particles (I) composed of ethylene-unsaturated carboxylic acid copolymer (A) have a weight average particle size (measurement method: light scattering measurement) of, for example, 0.01 μm or more, preferably 0.02 μm or more, and for example, 10 μm or less, preferably 1 μm or less.

In the dispersion of ethylene-unsaturated carboxylic acid copolymer (A), the ethylene-unsaturated carboxylic acid copolymer (A) solid content concentration is, for example, 10 mass % or more, preferably 20 mass % or more, and for example, 60 mass % or less, preferably 50 mass % or less.

The dispersion of ethylene-unsaturated carboxylic acid copolymer (A) can be obtained as a commercially available product. Examples of the commercially available products include the following: trade name Chemipearl S100 (ethylene content in the material: 85 mass %, unsaturated carboxylic acid type: methacrylic acid, neutralized sodium hydroxide, solid content 27%, manufactured by Mitsui Chemicals, Inc.), trade name Chemipearl S80N (ethylene content in the material: 80 mass %, unsaturated carboxylic acid type: acrylic acid, neutralized ammonium hydroxide, solid content 24%, manufactured by Mitsui Chemicals, Inc.), and trade name Chemipearl S650 (ethylene content in the material: 80 mass %, unsaturated carboxylic acid type: methacrylic acid, neutralized sodium hydroxide, solid content 27%, manufactured by Mitsui Chemicals, Inc.).

These ethylene-unsaturated carboxylic acid copolymer (A)s can be used singly, or can be used in combination of two or more.

<Polymer (B)>

The polymer (B) is a polymer produced by polymerization of the second monomer component, and has at least a (meth)acrylic acid ester unit produced from (meth)acrylic acid ester ((meth)acrylic acid ester monomer) as a polymerization unit. That is, the second monomer component contains (meth)acrylic acid ester as an essential component, and the polymer (B) produced by polymerization thereof is an acrylic polymer.

The (meth)acrylic acid ester is defined as acrylic acid ester and/or methacrylic acid ester.

Examples of the (meth)acrylic acid ester include (meth) acrylic acid ester with an alkyl moiety having 1 to 12 carbon atoms such as methyl (meth)acrylate, ethyl (meth)acrylate, propyl (meth)acrylate, n-butyl (meth)acrylate, iso-butyl (meth)acrylate, s-butyl (meth)acrylate, t-butyl (meth)acrylate, 2-ethylhexyl (meth)acrylate, and lauryl (meth)acrylate. These (meth)acrylic acid esters may be used singly or in a combination of two or more.

For the (meth)acrylic acid ester, preferably, methyl (meth) acrylate, ethyl (meth)acrylate, n-butyl (meth)acrylate, iso-butyl (meth)acrylate, t-butyl (meth)acrylate, and 2-ethylhexyl (meth)acrylate are used, and more preferably, methyl (meth)acrylate, n-butyl (meth)acrylate is used, even more preferably, methyl methacrylate, n-butyl methacrylate, and butyl acrylate are used.

The polymer (B) can contain a polymerization unit produced from a copolymerizable monomer that is copolymerizable with (meth)acrylic acid ester as an optional component.

Examples of the copolymerizable monomers include a functional group-containing vinyl monomer, aromatic vinyl monomer, N-substituted unsaturated carboxylic acid amide, heterocyclic vinyl compound, vinylidene halide compound, α-olefins, and dienes.

Examples of the functional group-containing vinyl monomers include a carboxy group-containing vinyl monomer, hydroxyl group-containing vinyl monomer, amino group-containing vinyl monomer, glycidyl group-containing vinyl monomer, cyano group-containing vinyl monomer, sulfonic acid group-containing vinyl monomer and its salt, acetoacetoxy group-containing vinyl monomer, phosphoric acid group-containing compound, and amide group-containing vinyl monomer.

Examples of the carboxy group-containing vinyl monomer include (meth) acrylic acid, maleic anhydride, maleic acid, fumaric acid, itaconic acid, and crotonic acid.

Examples of the hydroxyl group-containing vinyl monomer include 2-hydroxyethyl (meth)acrylate and 2-hydroxypropyl (meth)acrylate.

Examples of the amino group-containing vinyl monomers include 2-aminoethyl (meth)acrylate, 2-(N-methylamino) ethyl (meth)acrylate, and 2-(N,N-dimethylamino) ethyl (meth)acrylate.

Examples of the glycidyl group-containing vinyl monomer include glycidyl (meth)acrylate.

Examples of the cyano group-containing vinyl monomer include (meth) acrylonitrile.

Examples of the sulfonic acid group-containing vinyl monomers include allylsulfonic acid and methallylsulfonic acid. Examples of the salts include alkali metal salts such as sodium salt and potassium salt, and ammonium salt of the above-described sulfonic acid group-containing vinyl monomer. To be specific, for example, sodium allylsulfonate, sodium methallylsulfonate, and methallylsulfonic acid ammonium are used.

Examples of the acetoacetoxy group-containing vinyl monomer include acetoacetoxyethyl (meth)acrylate.

Examples of the phosphoric acid group-containing compound include 2-methacryloyloxyethyl acid phosphate.

Examples of the amide group-containing vinyl monomer include (meth) acrylamide.

Examples of the vinyl esters include vinyl propionate (but excluding vinyl acetate).

Examples of the aromatic vinyl monomer include styrene, α-methylstyrene, and divinylbenzene.

Examples of the N-substituted unsaturated carboxylic acid amide include N-methylol (meth) acrylamide.

Examples of the heterocyclic vinyl compound include vinyl pyrrolidone.

Examples of the vinylidene halide compound include vinylidene chloride and vinylidene fluoride.

Examples of the α-olefins include ethylene and propylene.

Examples of the dienes include butadiene.

Furthermore, for the copolymerizable monomer, a cross-linkable vinyl monomer can be used.

Examples of the crosslinkable vinyl monomer include compounds having two or more vinyl groups such as methylenebis(meth) acrylamide, divinylbenzene, and polyethylene glycol chain-containing di(meth)acrylate.

These copolymerizable monomers may be used singly or in a combination of two or more.

For the copolymerizable monomer, preferably, a functional group-containing vinyl monomer is used.

As described above, (meth)acrylic acid ester includes acrylic acid ester and methacrylic acid ester, but in view of water resistance, preferably, methacrylic acid ester is used.

In the polymer (B), the (meth)acrylic acid ester content and the copolymerizable monomer content relative to a total amount of the monomer component is as follows: the (meth)acrylic acid ester content is, for example, 50 mass % or more, preferably 70 mass % or more, more preferably 77 mass % or more. The copolymerizable monomer content is 50 mass % or less, preferably 30 mass % or less, even more preferably 23 mass % or less.

When the (meth)acrylic acid ester content and the copolymerizable monomer content are within the above-described range, excellent adhesive strength and anti-blocking can be achieved.

For the second monomer component, (meth)acrylic acid ester can be used singly without containing the copolymerizable monomer, and the (meth)acrylic acid ester and the copolymerizable monomer can be used in combination at the above-described ratio. Preferably, (meth)acrylic acid ester is singly used, or the (meth)acrylic acid ester and the copolymerizable monomer are used in combination at the above-described ratio.

When the (meth)acrylic acid ester is singly used for the second monomer component, for the second monomer component, even more preferably, (meth)acrylic acid ester having an alkyl moiety with 4 carbon atoms is singly used, or (meth)acrylic acid ester having an alkyl moiety with 1 carbon atom and (meth)acrylic acid ester having an alkyl moiety with 4 carbon atoms are used in combination.

When (meth)acrylic acid ester having an alkyl moiety with 4 carbon atoms is singly used as the second monomer component, particularly preferably, it is composed singly of n-butyl methacrylate, or composed of a combination of n-butyl methacrylate and n-butyl acrylate.

When the second monomer component is a combination of (meth)acrylic acid ester having an alkyl moiety with 1 carbon atom and (meth)acrylic acid ester having an alkyl moiety with 4 carbon atoms, particularly preferably, a combination of methyl methacrylate and n-butyl methacrylate, or a combination of methyl methacrylate and n-butyl acrylate is used.

With such a second monomer component, the glass transition temperature of the polymer (B) can be adjusted to the range to be described later.

When the carboxy group-containing vinyl monomer is used as the copolymerizable monomer, the carboxy group-containing vinyl monomer content is, in view of production stability of the composite particles (D), relative to a total amount of the second monomer component, for example, 5 mass % or less, preferably 3 mass % or less. Preferably, the second monomer component does not contain the carboxy group-containing vinyl monomer.

For the polymerization of the second monomer component, a known polymerization method is used without particular limitation. For example, water, the second monomer component and the polymerization initiator are blended, and the second monomer component is polymerized in water.

The polymerization initiator is not particularly limited, and examples thereof include hydrogen peroxide; persulfates such as ammonium persulfate, potassium persulfate, and sodium persulfate; organic peroxides such as cumene hydroperoxide, t-butylhydroperoxide, benzoyl peroxide, t-butylperoxy-2-ethylhexanoate, t-butylperoxybenzoate, and lauroylperoxide; azo compounds such as azobis isobutyronitrile; and redox initiators of a combination of these hydrogen peroxides, persulfates, organic peroxides, and azo compounds with a reducing agent such as metal ion including iron ion, sodium sulfoxylate, formaldehyde, sodium metabisulfite, sodium hydrogen sulfite, L-ascorbic acid, and Rongalite. These polymerization initiators may be used singly or in a combination of two or more.

The polymerization initiator is blended in an amount suitably set in accordance with purpose and use, and relative to a total amount of the second monomer component, for example, 0.1 mass % or more, and for example, 5 mass % or less.

In polymerization, as necessary, a molecular weight regulating agent can be blended.

Examples of the molecular weight regulating agent include mercaptans such as t-dodecylmercaptan and n-dodecylmercaptan; and allyl compounds such as allylsulfonic acid, methallylsulfonic acid and their sodium carbonate salt. These molecular weight regulating agents may be used singly or in a combination of two or more. The molecular weight regulating agent is blended in an amount suitably set in accordance with purpose and use.

The polymerization conditions are as follows: under normal pressure, the polymerization temperature is, for example, 30° C. or more, preferably 50° C. or more, and for example, 95° C. or less, preferably 85° C. or less. The polymerization time is, for example, 1 hour or more, preferably 2 hours or more, and for example, 30 hours or less, preferably 20 hours or less.

In production of the polymer (B), in view of improvement in production stability, as necessary, an emulsifier (surfactant) can be blended.

Examples of the emulsifiers (surfactant) include anionic surfactant, nonionic surfactant, and cationic surfactant.

Examples of the anionic surfactant include sodium dodecylbenzene sulphonate, sodium lauryl sulfate, sodium alkyl diphenyl ether disulfonate, sodium alkyl naphthalenesulfonate, sodium dialkyl sulfosuccinate, sodium stearate, potassium oleate, sodium dioctyl sulfosuccinate, polyoxyethylenealkylether sodium sulfate, polyoxyethylenealkylether sodium sulfate, polyoxyethylenealkylphenylether sodium sulfate, sodium dialkyl sulfosuccinate, sodium stearate, sodium oleate, and t-octylphenoxyethoxypolyethoxyethylsodium sulfate salt.

Examples of the nonionic surfactant include polyoxyethylene lauryl ether, polyoxyethyleneoctylphenylether, polyoxyethyleneoleylphenylether, polyoxyethylenenonylphenylether, oxyethylene-oxypropyleneblock copolymer, t-octylphenoxyethylpolyethoxyethanol, and nonylphenoxyethylpolyethoxyethanol.

Examples of the cationic surfactant include lauryltrimethylammoniumchloride and stearyltrimethylammoniumchloride.

These emulsifiers (surfactant) may be used singly or in a combination of two or more.

For the emulsifier (surfactant), preferably, anionic surfactant is used, more preferably, sodium dodecylbenzene sulphonate is used.

The emulsifier (surfactant) is blended in an amount without particular limitation, and in view of production stability of the composite particles (D), relative to a total amount of the second monomer component, for example, 0.02 mass % or more, and for example, 5 mass % or less.

In production of the polymer (B), in view of improvement in production stability, known additives such as the following can be added at a suitable ratio: a pH adjusting agent, a sequestering agent such as ethylene diamine tetraacetic acid and its salt, mercaptans, and molecular weight regulating agent such as a low molecular weight halogen compound (chain transfer agent).

The weight-average molecular weight of the polymer (B) is, based on polystyrene standard calibration of Gel Permeation Chromatography (GPC), for example, 5000 or more, preferably 10000 or more, and for example, 1000000 or less, preferably 500000 or less.

The polymer (B) has a glass transition temperature of −28° C. or more, preferably −10° C. or more, and 80° C. or less, preferably 60° C. or less.

When the polymer (B) has a glass transition temperature within the above-described range, excellent adhesive strength and anti-blocking can be achieved.

In particular, in view of improving adhesive strength, the polymer (B) has a glass transition temperature of preferably 20° C. or less, more preferably 10° C. or less.

In view of improving anti-blocking, the polymer (B) has a glass transition temperature of preferably more than 0° C., even more preferably 10° C. or more.

<Ethylene-Vinyl Acetate Copolymer (C)>

The ethylene-vinyl acetate copolymer (C) is produced by copolymerizing ethylene and vinyl acetate. In the ethylene-vinyl acetate copolymer (C), ethylene and vinyl acetate are copolymerized at a ratio of the following: ethylene is preferably 50 to 95 mass %, and vinyl acetate is preferably 5 to 50 mass %.

In the copolymer (C), ethylene is preferably 52 mass % or more, more preferably 54 mass % or more, preferably 90 mass % or less, more preferably 85 mass % or less, in view of improving adhesive strength, even more preferably 80 mass % or less. Vinyl acetate is preferably 10 mass % or more, more preferably 15 mass % or more, in view of improving adhesive strength, more preferably 20 mass % or more, preferably 48 mass % or less, even more preferably 46 mass % or less.

When ethylene and vinyl acetate are copolymerized at a ratio within above-described range, a heat seal material with excellent low temperature heat sealing properties can be produced.

The ethylene-vinyl acetate copolymer (C) of the present invention may contain carbon monoxide as a polymerization unit. The carbon monoxide unit relative to the copolymer is 2 to 40 mass %, more preferably 5 to 30 mass %.

The ethylene-vinyl acetate copolymer (C) has a MFR (Melt flow rate) of preferably 2 to 1000 g/10 min, more preferably 5 to 500 g/10 min.

<Resin Component>

The ethylene-unsaturated carboxylic acid copolymer (A) content relative to 100 mass % of the resin component of the present invention is preferably 35 to 70 mass %, more preferably 40 to 68 mass %, particularly preferably 45 to 67 mass %.

When the ethylene-unsaturated carboxylic acid copolymer (A) content relative to a total amount of the resin component is within the above-described range, excellent adhesive strength can be achieved.

The ethylene-unsaturated carboxylic acid copolymer (A) content in the resin component can be calculated from the ratio of the amount of the charged material component.

The polymer having an acrylic acid ester unit as a polymerization unit (B) content is preferably 25 to 64.5 mass %, more preferably 27 to 55 mass %, particularly preferably 28 to 50 mass %.

The ethylene-vinyl acetate copolymer (C) content is preferably 0.5 to 20 mass %, more preferably 1 to 15 mass %, particularly preferably 2 to 10 mass %.

(where total amount of (A)(B)(C) is 100%)

<Composite Particles (D)>

The ethylene-unsaturated carboxylic acid copolymer (A) and the polymer (B) can form the composite particles (D). The form of the composite particles (D) is not particularly limited as long it contains the above-described ethylene-unsaturated carboxylic acid copolymer (A) and polymer (B), and the structure can be, for example, a core/shell structure, composite structure, localized structure, potbelly structure, octopus *ocellatus* structure, raspberry structure, multigrain composite structure, and IPN structure.

Particularly, a structure in which the polymer (B) is dispersed in a continuous phase of the ethylene-unsaturated carboxylic acid copolymer (A) is preferable.

The method for producing the composite particles (D) is not particularly limited, and a known method can be used.

For example, the following method can be used to produce the composite particles (D) having a structure in which the polymer (B) is dispersed in the continuous phase of the ethylene-unsaturated carboxylic acid copolymer (A).

First, the composite particles (D) can be produced by producing the ethylene-unsaturated carboxylic acid copolymer (A) by the above-described method, and producing the polymer (B) by the above-described method in the presence of the produced ethylene-unsaturated carboxylic acid copolymer (A). Alternatively, the ethylene-unsaturated carboxylic acid copolymer (A) is emulsified in the presence of water, and the dispersion liquid containing resin particles (I) composed of the ethylene-unsaturated carboxylic acid copolymer (A) is produced, and then (meth)acrylic acid ester monomer is added to the dispersion liquid to form the polymer (B), thereby producing the composite particles (D) having the copolymer (A) and the polymer (B).

Alternatively, the composite particles (D) can be produced by, for example, as follows: first, the polymer (B) is produced by the above-described method, and in the presence of (for example, in dispersion) the produced polymer (B), the ethylene-unsaturated carboxylic acid copolymer (A) is produced by the above-described method.

Preferably, the ethylene-unsaturated carboxylic acid copolymer (A) is emulsified in the presence of water to produce the dispersion liquid containing the resin particles (I) composed of the ethylene-unsaturated carboxylic acid copolymer (A), and then (meth)acrylic acid ester monomer is added to the dispersion liquid to form the polymer (B), thereby producing the composite particles (D) having the copolymer (A) and polymer (B). The ethylene-unsaturated carboxylic acid copolymer (A) has self-emulsifying properties, and therefore the amount of the emulsifier (surfactant) can be a small amount. When a large amount of the emulsifier is blended, adhesiveness may be affected. Examples of the ethylene-unsaturated carboxylic acid copolymer (A) include commercially available products as described above.

In the composite particles (D), the ethylene-unsaturated carboxylic acid copolymer (A) content and the polymer (B) content relative to their total are as follows: the ethylene-unsaturated carboxylic acid copolymer (A) content is, for example, 1 mass % or more, preferably 5 mass % or more, more preferably 10 mass % or more, and for example, 95 mass % or less, preferably 70 mass % or less, more preferably, less than 50 mass %. The polymer (B) content is, for example, 5 mass % or more, preferably 30 mass % or more, more preferably, more than 50 mass %, and for example, 99 mass % or less, preferably 95 mass % or less, more preferably 90 mass % or less.

When the ethylene-unsaturated carboxylic acid copolymer (A) content and the polymer (B) content are within the above-described range, excellent adhesive strength can be achieved.

The ethylene-unsaturated carboxylic acid copolymer (A) content and the polymer (B) content in the composite particles (D) can be calculated from the ratio of the amount of the charged material components.

The composite particles (D) have a weight average particle size (measurement method: light scattering measurement) of, for example, 10 nm or more, and for example, 10 μm or less, preferably 1 μm or less.

The composite particles (D) have an average particle size observed by an electron microscope of, for example, 50 nm or more, preferably 60 nm or more, more preferably 80 nm or more, and for example, 300 nm or less, more preferably 200 nm or less, even more preferably 120 nm or less.

When the average particle size is within the above-described range, storage stability of the aqueous dispersion of the composite particles (D) can be improved, and excellent transparency and water resistance of the laminate (described later) can be achieved.

<Composite Particles (E)>

The ethylene-unsaturated carboxylic acid copolymer (A) and the ethylene-vinyl acetate copolymer (C) can form the composite particles (E). The form of the composite particles (E) is not particularly limited as long as it contains the above-described ethylene-unsaturated carboxylic acid copolymer (A) and ethylene-vinyl acetate copolymer (C), and the structure can be, for example, a core/shell structure, composite structure, localized structure, potbelly structure, octopus *ocellatus* structure, raspberry structure, multigrain composite structure, and IPN structure.

Particularly, a structure in which the ethylene-unsaturated carboxylic acid copolymer (A) is dispersed in a continuous phase of the ethylene-vinyl acetate copolymer (C) is preferable. The composite particles (E) has a weight average particle size of generally about 50 to 300 nm, preferably 60 to 200 nm, particularly preferably 80 to 120 nm.

The method for producing the composite particles (E) is not particularly limited, and a known method can be used.

For example, the following method can be used to produce the composite particles (E) having a structure in which the ethylene-unsaturated carboxylic acid copolymer (A) is dispersed in the continuous phase of the ethylene-vinyl acetate copolymer (C).

The composite particles (E) can be produced by first producing the ethylene-unsaturated carboxylic acid copolymer (A) and the ethylene-vinyl acetate copolymer (C) by the above-described method, and emulsifying the ethylene-unsaturated carboxylic acid copolymer (A) and the ethylene-vinyl acetate copolymer (C) simultaneously together. The ethylene-unsaturated carboxylic acid copolymer (A) has self emulsifying properties, and therefore the amount of the emulsifier (surfactant) can be a small amount. When a large amount of the emulsifier is blended, adhesiveness may be affected. Examples of the ethylene-vinyl acetate copolymer (C) include commercially available products as described above.

In the composite particles (E), the ethylene-unsaturated carboxylic acid copolymer (A) content and the ethylene-vinyl acetate copolymer (C) content relative to their total are as follows: the ethylene-vinyl acetate copolymer (C) content is, for example, 1 mass % or more, preferably 5 mass % or more, more preferably 10 mass % or more, and for example, 95 mass % or less, preferably 70 mass % or less, more preferably, less than 50 mass %. The ethylene-unsaturated carboxylic acid copolymer (A) content is, for example, 5 mass % or more, preferably 30 mass % or more, more preferably, more than 50 mass %, and for example, 99 mass % or less, preferably 95 mass % or less, more preferably 90 mass % or less.

When the ethylene-unsaturated carboxylic acid copolymer (A) content and the ethylene-vinyl acetate copolymer (C) content are within the above-described range, excellent adhesive strength can be achieved.

The ethylene-unsaturated carboxylic acid copolymer (A) content and the ethylene-vinyl acetate copolymer (C) content in the composite particles (E) can be calculated from the ratio of the amount of the charged material component.

The composite particles (E) have a weight average particle size (measurement method: light scattering measurement) of, for example, 10 nm or more, and for example, 10 μm or less, preferably 1 μm or less.

When the weight average particle size is within the above-described range, storage stability of the aqueous dispersion of the composite particles (E) can be improved, and excellent transparency and water resistance of the laminate (described later) can be achieved.

The aqueous dispersion can further contain, in addition to the above-described resin component, additives.

Examples of the additives include known additives such as the above-described emulsifier, and also curing agent, cross-linking agent, film-forming auxiliary agent, antifoaming agent, anti-repelling agent, leveling agent, tackifier, hardener, antiseptic agent, thickening agent, antifreezing agent, dispersing agent, inorganic pigment, and organic pigment. These additives may be used singly or in a combination of two or more. The timing of the blending of the additive is suitably set in accordance with purpose and use.

The aqueous dispersion has a solid content concentration of, for example, 10 mass % or more, preferably 20 mass % or more, and for example, 60 mass % or less, preferably 50 mass % or less.

The aqueous dispersion has a pH of, for example, 7 or more, preferably 8 or more, and for example, 11 or less, preferably 10 or less.

When such an aqueous dispersion is used for forming the adhesive layer (heat seal layer) of the laminate, a laminate with excellent adhesive strength can be produced.

Therefore, the aqueous dispersion can be suitably used as an adhesive composition for forming an adhesive layer in a laminate including a substrate and an adhesive layer laminated on at least on one side surface of the substrate.

To be more specific, in the FIGURE, a laminate 1 includes a substrate 2, and an adhesive layer 3 laminated on one side surface of the substrate 2.

Examples of the substrate 2 include a plastic film composed of plastic materials such as cellophane, polyethylene, ethylene-vinyl acetate copolymer, ionomer, polypropylene, polyamide (nylon), polyester, polyvinyl chloride, polyvinylidene chloride, polyvinyl alcohol, ethylene-vinyl alcohol copolymer, polycarbonate, polystyrene, and polyacrylonitrile copolymer; a vapor deposited film in which metals such as aluminum, gold, silver, copper, nickel, zinc, titanium, cobalt, indium, and chromium, and oxides such as aluminum oxide, and silicon oxide are vapor deposited on these plastic films; metal foil such as aluminum foil; paper; and nonwoven fabric.

These substrates 2 may be used singly or in a combination of two or more.

For the substrate 2, preferably, metal foil, more preferably, aluminum foil is used.

The adhesive layer 3 can be produced by applying (coating) the above-described aqueous dispersion on one side surface of the substrate 2, and drying.

The aqueous dispersion can be applied (coating) by a method without particular limitation, and for example, a known method such as gravure coating, roll coating, immersion coating, and spray coating can be used.

The drying conditions are as follows: the drying temperature is, for example, 100 to 200° C., and the drying time is, for example, 10 seconds to 30 minutes.

Before the application and drying, to improve adherence between the substrate 2 and the adhesive layer 3, a primer (titanate, polyethylene-imine, etc.) can be applied to the substrate 2, and it can be subjected to pretreatment such as corona discharge treatment and chemical treatment.

In such a laminate 1, the above-described aqueous dispersion is used for the adhesive layer 3, and therefore excellent adhesive strength and anti-blocking can be achieved. Furthermore, it is an aqueous dispersion, not a dispersion in which particles are dispersed in an organic solvent such as ethyl acetate and toluene, and therefore the amount of the remaining organic solvent in the adhesive layer 3 can be preferably 100 ppm or less, more preferably 10 ppm or less.

Therefore, the laminate 1 is used as a heat seal material in various industrial fields.

As shown in the FIGURE, in the heat seal, the substrate 2 is bonded to the adherend layer 4 (ref: dotted line in the FIGURE) with the adhesive layer 3.

The adherend layer 4 is a material to which the above-described laminate 1 is allowed to adhere to, and examples thereof include cellophane, polyethylene, ethylene-vinyl acetate copolymer, ionomer, polypropylene, polyamide (nylon), polyester, polyvinyl chloride, polyvinylidene chloride, polyvinyl alcohol, ethylene-vinyl alcohol copolymer, polycarbonate, polystyrene, and polyacrylonitrile copolymer; a vapor deposited film in which metals such as aluminum, gold, silver, copper, nickel, zinc, titanium, cobalt, indium, and chromium, and oxides such as aluminum oxide, and silicon oxide are vapor deposited on these plastic films; metal foil such as aluminum foil; paper; and nonwoven fabric.

The adherend layer 4 can also be the laminate 1 including the substrate 2 and the adhesive layer 3.

These adherend layers 4 may be used singly or in a combination of two or more.

For the adherend layer 4, in view of adhesive strength and ease in adhesion, preferably, a plastic film composed of polyvinyl chloride and polyvinylidene chloride are used.

The substrate 2 and the adherend layer 4 can be heat sealed by a method without particular limitation, and a known method is used. For example, as shown in the FIGURE, the substrate 2 and the adherend layer 4 are laminated with the adhesive layer 3 interposed therebetween, and thereafter, they are heated and pressed. When the laminate 1 is used as the adherend layer 4, the adhesive layers 3 are bonded together, and two substrates 2 are laminated with the two layers of the adhesive layer 3, and they are heated and pressed.

The heating temperature is, for example, 80° C. or more, preferably 100° C. or more, and for example, 250° C. or less, preferably 200° C. or less. The pressure is, for example, 50 kPa or more, preferably 100 kPa or more, and for example, 500 kPa or less, preferably 300 kPa or less.

In this manner, the substrate 2 and the adherend layer 4 are heat sealed (thermocompression bonded).

The adhesive strength between the substrate 2 and the adherend layer 4 is measured by peel strength between the substrate 2 and the adherend layer 4. Preferably, the peel strength at 180 degree peel is 900 g/15 mm or more after thermocompression bonded at a temperature of 110° C. and a pressure of 2 kg/cm$^2$ for 0.5 seconds.

The present invention includes the laminate 1 (in other words, laminate 1 including adherend layer 4 laminated on one side surface of the adhesive layer 3) in which the adherend layer 4 is laminated on one side surface of the adhesive layer 3, irrespective of its heat seal conditions (that is, before and after heat seal).

Such a laminate 1 has excellent adhesive strength and anti-blocking, and therefore it is suitably used in various industrial fields as a packaging material.

The object to be wrapped/packed by the laminate 1 is not particularly limited, and examples thereof include industrial products such as confectionaries, food, daily use articles, medical products, and paper.

In particular, in the field of medical products and food packaging, the following effects can be expected: denaturing of the packaging material and packaged/wrapped material at the time of heat sealing can be suppressed, and charging speed increases rapidly which improves productivity and decreases electricity consumption. Furthermore, the adhesive composition for forming the adhesive layer 3 is an aqueous dispersion, and therefore burden on environment is decreased.

EXAMPLES

While in the following, the present invention is described with reference to Examples and Comparative Examples, the present invention is not limited to any of them. The specific numerical values of mixing ratio (content ratio), physical property value, and parameter used in the following can be replaced with upper limit values (numerical values defined with "or less" or "below") or lower limit values (numerical values defined with "or more" or "above") of corresponding numerical values in mixing ratio (content ratio), physical property value, and parameter described in "DESCRIPTION OF EMBODIMENTS" above.

Example 1

A reaction vessel was charged with 200 parts by mass of a sodium hydroxide-neutralized ethylene-unsaturated carboxylic acid copolymer (A) (ethylene content: 85 mass %, methacrylic acid content: 15 mass %, solid content: 27%) and 27 parts by mass of deionized water, and the temperature was increased to 80° C. under nitrogen flow, and 0.3 parts by mass of potassium persulfate was added. The degree of neutralization at this time was measured by the following method.

Separately, 100 parts by mass of n-butyl methacrylate and 0.2 parts by mass of n-dodecylmercaptan (molecular weight regulating agent) were emulsified with 0.4 parts by mass of sodium dodecylbenzenesulfonate (emulsifier) in 40 parts by mass of deionized water, and the produced emulsified mixture was dropped for 2 hours into the reaction vessel.

Thereafter, it was allowed to stand at 80° C. for 2 hours, thereby completing the polymerization. The acrylic polymer (B) was formed, and an aqueous dispersion of composite particles (D) with a solid content concentration of 38% was produced in this manner.

Then, a reaction vessel was charged with 100 parts by mass of resin produced by melt-kneading the above-described ethylene-unsaturated carboxylic acid copolymer (A) (ethylene content: 85 mass %, methacrylic acid content: 15 mass %) and ethylene-vinyl acetate copolymer (C) (ethylene content: 67 mass %, vinyl acetate content: 33 mass %) at 150° C. using a uniaxial extruder, 5 parts by mass of 48% potassium hydroxide, and 239 parts by mass of deionized water, and the temperature was increased to 150° C. under nitrogen flow, and it was allowed to stand at the same temperature for 4 hours. The degree of neutralization at this time was measured by the following method. An aqueous dispersion of composite particles (E) with a solid content concentration of 42% including the ethylene-unsaturated carboxylic acid copolymer (A) and ethylene-vinyl acetate copolymer (C) was produced in this manner.

Thereafter, to 100 parts by mass of the aqueous dispersion of the composite particles (D), 31 parts by mass of an aqueous dispersion of the composite particles (E) was added and mixed. Thereafter, deionized water was used to adjust the solid content concentration to 40%, thereby producing an aqueous dispersion.

Table 1 shows the amount of the components in the aqueous dispersion, with (A)+(B)+(C) as 100%. The amount of (A) component is a total of the composite particles (D)-derived (A) component and the composite particles (E)-derived (A) component.

Examples 2 to 4

An aqueous dispersion was produced in the same manner as in Example 1, except that the ethylene-unsaturated carboxylic acid copolymer (A), polymer (B), and ethylene-vinyl acetate copolymer (C) were changed in accordance with Table 1.

Example 5

An aqueous dispersion was produced in the same manner as in Example 2, except that (meth)acrylic acid ester monomer of Example 2 was changed to 80 parts by mass of n-butyl methacrylate and 20 parts by mass of n-butyl acrylate.

Example 6

An aqueous dispersion was produced in the same manner as in Example 2, except that (meth)acrylic acid ester monomer of Example 2 was changed to 90 parts by mass of n-butyl methacrylate and 10 parts by mass of n-butyl acrylate.

Example 7

An aqueous dispersion was produced in the same manner as in Example 2, except that ethylene-vinyl acetate copolymer (C) of Example 2 was changed to ethylene-vinyl acetate copolymer (C) with ethylene content: 72 mass % and vinyl acetate content: 28 mass %.

Example 8

An aqueous dispersion was produced in the same manner as in Example 2, except that ethylene-vinyl acetate copolymer (C) of Example 2 was changed to ethylene-vinyl acetate copolymer (C) with ethylene content: 81 mass % and vinyl acetate content: 19 mass %.

Comparative Example 1

An aqueous dispersion was produced in the same manner as in Example 1, except that instead of the aqueous dispersion of the composite particles (E), an aqueous dispersion of ethylene-unsaturated carboxylic acid copolymer (A) produced as follows was used: a reaction vessel was charged with 100 parts by mass of ethylene-unsaturated carboxylic acid copolymer (A) with a solid content concentration of 42% (ethylene content: 85 mass %, methacrylic acid content: 15 mass %), 6 parts by mass of 48% potassium hydroxide, and 241 parts by mass of deionized water, and the temperature was increased to 150° C. under nitrogen flow, and it was allowed to stand at the same temperature for 4 hours.

Comparative Examples 2 and 3

An aqueous dispersion was produced in the same manner as in Comparative Example 1, except that the ethylene-unsaturated carboxylic acid copolymer (A) and polymer (B) were changed in accordance with Table 1.

Comparative Example 4

An aqueous dispersion was produced in the same manner as in Comparative Example 2, except that (meth)acrylic acid ester monomer of Comparative Example 2 was changed to 80 parts by mass of n-butyl methacrylate and 20 parts by mass of n-butyl acrylate.

Comparative Example 5

An aqueous dispersion was produced in the same manner as in Comparative Example 2, except that (meth)acrylic acid ester monomer of Comparative Example 2 was changed to 41 parts by mass of n-butyl methacrylate and 59 parts by mass of n-butyl acrylate.

Comparative Example 6

An aqueous dispersion was produced in the same manner as in Example 1, except that an aqueous dispersion of ethylene-vinyl acetate copolymer (C) (ethylene content: 81 mass %, vinyl acetate content: 19 mass %) (solid content concentration 40%) was used instead of the aqueous dispersion of the composite particles (E), and the ethylene-unsaturated carboxylic acid copolymer (A), polymer (B), and ethylene-vinyl acetate copolymer (C) were changed in accordance with Table 1.

<Measurement Method>
1) Degree of Neutralization

The infrared absorption spectrum of the sample was measured, and the absorption peak height of 1700 $cm^{-1}$ corresponding to carboxy group is determined (peak height is a).

The sample was allowed to contact with hydrochloric acid to remove metal ion (demetallization) in the resin to produce acid copolymer with no ion bond (inner molecular crosslinking).

The infrared absorption spectrum of the sample of the acid copolymer was measured, and the absorption peak height of 1700 $cm^{-1}$ is determined (peak height is b).

The peak height a corresponds to the number of the carboxyl group in the resin with no ion bond.

The peak height b corresponds to the number of the all carboxyl group in the resin.

The degree of neutralization (%) is determined based on the following formula.

Degree of neutralization (%)=100−100×a/b

2) Glass Transition Temperature

The glass transition temperature is determined by the method described in Chapter XII of Computational Materials Science of Polymers (A. A. Askadskii, Cambridge Intl Science Pub (2005/12/30)). Here, the glass transition temperature is determined using the calculation software CHEOPS (version 4.0, Million Zillion Software) in which the above-described method is used.

3) Peel Strength (g/15 mm)

The aqueous dispersion was applied to the hard aluminum foil (20 μm) with an application amount of 3 g/m² with a wire bar, and dried at 120° C. for 1 minute, thereby producing a laminate.

The produced laminate was allowed to stand under normal temperature for a whole day and night, and then cut out into a strip of 15 mm width. The applied surface and a polyvinyl chloride sheet (200 μm) were placed on top of another, and they were heat sealed at 110° C. or 155° C. with a pressure of 2 kg/cm² for 0.5 seconds. The obtained test piece was used to measure 90 degree peel strength and 180 degree peel strength under conditions of testing speed of 200 mm/second. The results are shown in Table 1. Adhesiveness was evaluated in accordance with the following criteria with 180 degree peel strength at heat seal temperature of 110° C. The results are shown in Table 1.

Excellent: 1300 g/15 mm or more
Good: 1000 g/15 mm or more and less than 1300 g/15 mm
Fair: 500 g/15 mm or more and less than 1000 g/15 mm
Bad: less than 500 g/15 mm 4) Anti-Blocking The laminate produced as described above was cut out into a 5 cm square, and the applied surfaces were placed on top of another. Anti-blocking was evaluated based on the following criteria under conditions of 45° C., 250 g/cm², and 24 hours. The results are shown in Table 1.

Excellent: The applied surfaces placed on top of another were parted without resistance.
Good: The coating (adhesive layer) was partially bonded.
Bad: The coating (adhesive layer) was entirely bonded.

TABLE 1

| | | | | Ex. -1 | Ex. -2 | Ex. -3 | Ex. -4 | Ex. -5 | Ex. -6 | Ex. -7 |
|---|---|---|---|---|---|---|---|---|---|---|
| Aqueous dispersion | Composite particles (D) | Ethylene - unsaturated carboxylic acid copolymer (A) | Amount blended (parts by mass of solid content) | 28 | 21 | 15 | 15 | 21 | 21 | 21 |
| | | | Degree of neutralization (%) | 54 | 54 | 54 | 54 | 54 | 54 | 54 |
| | | Polymer (B) | Amount blended (parts by mass of solid content) | 48 | 38 | 28 | 28 | 38 | 38 | 38 |
| | | | Tg(° C.) | 20 | 20 | 20 | 20 | 0 | 10 | 20 |
| | Composite particles (E) | Ethylene - unsaturated carboxylic acid copolymer (A) | Amount blended (parts by mass of solid content) | 24 | 37 | 51 | 46 | 37 | 37 | 37 |
| | | | Degree of neutralization (%) | 30 | 30 | 30 | 30 | 30 | 30 | 30 |
| | | Ethylene-vinyl acetate copolymer (C) | Amount blended (parts by mass of solid content) | 3 | 4 | 6 | 11 | 4 | 4 | 4 |
| | | | Vinyl acetate content (mass %) | 33 | 33 | 33 | 33 | 33 | 33 | 28 |
| | Ethylene - unsaturated carboxylic acid copolymer (A) particles | | Amount blended (parts by mass of solid content) | — | — | — | — | — | — | — |
| | | | Degree of neutralization (%) | — | — | — | — | — | — | — |
| | Ethylene-vinyl acetate copolymer (C) particles | | Amount blended (parts by mass of solid content) | — | — | — | — | — | — | — |
| | | | Vinyl acetate content (mass %) | — | — | — | — | — | — | — |
| | | | Mass ratio (A)/(B)/(C) | 49/48/3 | 58/38/4 | 66/28/6 | 61/28/11 | 58/38/4 | 58/38/4 | 58/38/4 |
| Evaluation on properties | Peel strength (g/15 mm) | Heat seal temperature 110(° C.) | 90 degree peel | 710 | 650 | 460 | 380 | 670 | 660 | 620 |
| | | | 180 degree peel | 1470 | 1380 | 1360 | 1430 | 1410 | 1390 | 1320 |
| | | Heat seal temperature 155(° C.) | 90 degree peel | 1120 | 1200 | 1160 | 1250 | 1220 | 1210 | 1160 |
| | | | 180 degree peel | 1530 | 1570 | 1660 | 1530 | 1670 | 1630 | 1570 |
| | | Evaluation on adhesiveness | | Excellent | Excellent | Excellent | Excellent | Excellent | Excellent | Excellent |
| | | Antiblocking properties | | Excellent | Excellent | Excellent | Excellent | Good | Excellent | Excellent |

| | | | | Ex. -8 | Comp. Ex. -1 | Comp. Ex. -2 | Comp. Ex. -3 | Comp. Ex. -4 | Comp. Ex. -5 | Comp. Ex. -6 |
|---|---|---|---|---|---|---|---|---|---|---|
| Aqueous | Composite | Ethylene - | Amount blended | 21 | 28 | 21 | 15 | 21 | 21 | 34 |

TABLE 1-continued

| | | | | | | | | | | |
|---|---|---|---|---|---|---|---|---|---|---|
| dispersion particles (D) | unsaturated carboxylic acid copolymer (A) | (parts by mass of solid content) Degree of neutralization (%) | 54 | 54 | 54 | 54 | 54 | 54 | 54 |
| | Polymer (B) | Amount blended (parts by mass of solid content) | 38 | 48 | 38 | 28 | 38 | 38 | 63 |
| | | Tg(° C.) | 20 | 20 | 20 | 20 | 0 | −30 | 20 |
| Composite particles (E) | Ethylene - unsaturated carboxylic acid copolymer (A) | Amount blended (parts by mass of solid content) | 37 | — | — | — | — | — | — |
| | | Degree of neutralization (%) | 30 | — | — | — | — | — | — |
| | Ethylene-vinyl acetate copolymer (C) | Amount blended (parts by mass of solid content) | 4 | — | — | — | — | — | — |
| | | Vinyl acetate content (mass %) | 19 | — | — | — | — | — | — |
| Ethylene - unsaturated carboxylic acid copolymer (A) particles | | Amount blended (parts by mass of solid content) | — | 26 | 42 | 57 | 42 | 42 | — |
| | | Degree of neutralization (%) | — | 30 | 30 | 30 | 30 | 30 | — |
| Ethylene-vinyl acetate copolymer (C) particles | | Amount blended (parts by mass of solid content) | — | — | — | — | — | — | 3 |
| | | Vinyl acetate content (mass %) | — | — | — | — | — | — | 19 |
| | | Mass ratio (A)/(B)/(C) | 58/38/4 | 52/48/0 | 62/38/0 | 72/28/0 | 62/38/0 | 62/38/0 | 34/63/3 |
| Evaluation on properties | Peel strength (g/15 mm) | Heat seal temperature 110(° C.) 90 degree peel | 600 | 250 | 130 | 140 | 130 | 170 | 380 |
| | | 180 degree peel | 1250 | 830 | 750 | 430 | 650 | 720 | 90 |
| | | Heat seal temperature 155(° C.) 90 degree peel | 1120 | 640 | 520 | 380 | 550 | 570 | 950 |
| | | 180 degree peel | 1550 | 1280 | 1300 | 1310 | 1330 | 1130 | 1430 |
| | Evaluation on adhesiveness | | Good | Fair | Fair | Bad | Fair | Fair | Fair |
| | Antiblocking properties | | Excellent | Excellent | Excellent | Excellent | Good | Bad | Bad |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The aqueous dispersion and laminate of the present invention are suitably used as a packing material in various industrial products such as, for example, confectionaries, food, daily use articles, medical products, and paper.

The invention claimed is:

1. An aqueous dispersion containing a resin component and water,
wherein the resin component contains ethylene-unsaturated carboxylic acid copolymer (A), polymer having an acrylic acid ester unit as a polymerization unit (B), and ethylene-vinyl acetate copolymer (C), and
contains composite particles (D) having the ethylene-unsaturated carboxylic acid copolymer (A) and the polymer having an acrylic acid ester unit as a polymerization unit (B), and
composite particles (E) having the ethylene-unsaturated carboxylic acid copolymer (A) and the ethylene-vinyl acetate copolymer (C).

2. The aqueous dispersion of claim 1, wherein relative to 100 mass % of the resin component,
35 to 70% of the ethylene-unsaturated carboxylic acid copolymer (A) is contained,
25 to 64.5% of the polymer having an acrylic acid ester unit as a polymerization unit (B) is contained, and
0.5 to 20% of the ethylene-vinyl acetate copolymer (C) is contained (where a total of (A), (B), and (C) is 100%).

3. A method for producing the aqueous dispersion according to claim 1, the method including the steps of:
a step of producing a dispersion liquid 1 containing resin particles (I) composed of ethylene-unsaturated carboxylic acid copolymer (A) by emulsifying the ethylene-unsaturated carboxylic acid copolymer (A) in the presence of water;
a step of producing a dispersion liquid 2 containing composite particles (D) having the copolymer (A) and the polymer (B) by adding (meth)acrylic acid ester monomer in the dispersion liquid 1 to form the polymer having an acrylic acid ester unit as a polymerization unit B);
a step of producing a dispersion liquid 3 containing composite particles (E) having the copolymer (A) and the copolymer (C) by emulsifying the ethylene-unsaturated carboxylic acid copolymer (A) and ethylene-vinyl acetate copolymer (C) at the same time in the presence of water; and
a step of producing dispersion liquid containing the composite particles (D) and the composite particles (E) by mixing the dispersion liquid 2 and the dispersion liquid 3.

4. A laminate comprising
a substrate and an adhesive layer laminated on at least on one side surface of the substrate, wherein
the adhesive layer is produced by drying the aqueous dispersion according to claim 1.

5. The laminate according to claim 4, further comprising
an adherend layer laminated on one side surface of the adhesive layer.

6. The laminate according to claim 5, wherein
the adherend layer contains polyvinyl chloride and/or polyvinylidene chloride.

7. A laminate comprising
a substrate and an adhesive layer laminated on at least on one side surface of the substrate,
wherein the adhesive layer comprises composite particles (D) having ethylene-unsaturated carboxylic acid copolymer (A), and polymer having an acrylic acid ester unit as a polymerization unit (B), and
composite particles (E) having ethylene-unsaturated carboxylic acid copolymer (A), and ethylene-vinyl acetate copolymer (C).

\* \* \* \* \*